United States Patent
Aslandere et al.

(10) Patent No.: US 12,236,629 B2
(45) Date of Patent: Feb. 25, 2025

(54) OPERATING A MOTOR VEHICLE WITH STEREO CAMERA AND LIDAR

(71) Applicant: Ford Global Technologies, LLC, Dearborn, MI (US)

(72) Inventors: Turgay Isik Aslandere, Aachen/NRW (DE); Evangelos Bitsanis, Aachen/NRW (DE); Michael Marbaix, Haillot (BE); Alain Marie Roger Chevalier, Henri-Chapelle (BE); Frederic Stefan, Aachen/NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 595 days.

(21) Appl. No.: 17/037,127

(22) Filed: Sep. 29, 2020

(65) Prior Publication Data

US 2021/0097710 A1 Apr. 1, 2021

(30) Foreign Application Priority Data

Sep. 30, 2019 (DE) .......................... 102019126398.0

(51) Int. Cl.
| | |
|---|---|
| *G06T 7/70* | (2017.01) |
| *B60W 30/09* | (2012.01) |
| *B60W 60/00* | (2020.01) |
| *G01S 17/931* | (2020.01) |
| *G05D 1/00* | (2024.01) |

(Continued)

(52) U.S. Cl.
CPC .............. *G06T 7/70* (2017.01); *B60W 60/001* (2020.02); *G01S 17/931* (2020.01); *G05D 1/0248* (2013.01); *G05D 1/0251* (2013.01); *G06N 3/04* (2013.01); *G06N 3/08* (2013.01); *H04N 13/239* (2018.05); *B60W 30/09* (2013.01); *B60W 2420/403* (2013.01); *B60W 2420/408* (2024.01); *G05D 1/0088* (2013.01); *G06T 2207/10012* (2013.01); *G06T 2207/10028* (2013.01); *G06T 2207/20081* (2013.01); *G06T 2207/30168* (2013.01); *G06T 2207/30252* (2013.01)

(58) Field of Classification Search
CPC ....... G06T 7/70; H04N 13/239; G01S 17/931; B60W 60/001
USPC .......................................................... 348/46
See application file for complete search history.

(56) References Cited

U.S. PATENT DOCUMENTS

| | | |
|---|---|---|
| 7,974,442 B2 | 7/2011 | Camus et al. |
| 2017/0045895 A1* | 2/2017 | Wang ....................... G06T 7/246 |
| 2018/0281796 A1* | 10/2018 | Ravichandran ... B60W 50/0098 |

OTHER PUBLICATIONS

Kaempchen et al., "Stereo vision based pose estimation of parking lots using 3D vehicle models", DOI: 10.1109/IVS.2002.1187993—Source: IEEE Xplore Conference: Intelligent Vehicle Symposium, 2002. IEEE, vol. 2, https://www.researchgate.net/publication/4008053_Stereo_vision_based_pose_estimation_of_parking_lots_using_3D_vehicle_models.

(Continued)

*Primary Examiner* — On S Mung
(74) *Attorney, Agent, or Firm* — Frank A. MacKenzie; Brooks Kushman P.C.

(57) ABSTRACT

A request signal that indicates a quality for a determination of an orientation of a road user is received. The orientation of the road user is determined based on a) image data when the request signal indicates the quality is below a predetermined quality for the determination of the orientation of the road user, or b) on LIDAR data and image data when the request signal indicates the quality is the predetermined quality.

20 Claims, 4 Drawing Sheets

(51) Int. Cl.
  *G06N 3/04*    (2023.01)
  *G06N 3/08*    (2023.01)
  *H04N 13/239*  (2018.01)

(56) References Cited

OTHER PUBLICATIONS

Zhang et al., "Vehicle Detection Based on LiDAR and Camera Fusion", 2014 IEEE 17th International Conference on Intelligent Transportation Systems (ITSC) Oct. 8-11, 2014. Qingdao, China.

* cited by examiner

OPERATING A MOTOR VEHICLE WITH STEREO CAMERA AND LIDAR

CROSS-REFERENCE TO RELATED APPLICATION

This patent application claims priority to German Application No. DE102019126398.0 filed Sep. 30, 2019, which is hereby incorporated by reference in its entirety.

BACKGROUND

Motor vehicles can be designed for what is called autonomous driving. An autonomously driving motor vehicle is a self-driving motor vehicle that can drive, operate and park without any influence from a human driver (highly automated driving or autonomous driving). In the case where no manual operation on the part of the driver is necessary, the term robotic car is also used. In that case, the driver's seat can remain empty; steering wheel, brake pedal and accelerator pedal are possibly not present.

Such autonomous motor vehicles can capture their environment with the aid of various sensors and determine their own position and that of the other road users from the acquired information, drive toward a driving destination in cooperation with the navigation software and avoid collisions on the journey to said destination.

Such a sensor can be what is referred to as a LIDAR sensor. LIDAR (acronym for light detection and ranging) in this case denotes a method, related to radar, for optically measuring distance and speed and for range-finding. Rather than using radio waves as in RADAR, laser beams are used.

LIDAR sensors offer the advantage that they can scan a range of 360 degrees around the motor vehicle with a high resolution and speed. A LIDAR sensor typically uses an arrangement of laser-based sensors (e.g., 64) that rotate at a high speed (e.g., multiple 100 n/min). The LIDAR sensor is then able to capture obstacles that are struck by a laser beam. It is thus possible to determine coordinates of each strike or of each obstacle in the vicinity of the motor vehicle. By evaluating said LIDAR data it is also possible to acquire information relating to the terrain topology in the region around the motor vehicle.

However, the evaluation of the LIDAR data requires considerable computational power, especially due to the quantity of data that must be processed.

A further sensor can be a stereo camera system. Such a stereo camera system has two cameras and provides an image data set that also provides depth information relating to the captured environment.

In many traffic scenarios, such as overtaking or parking, it is necessary to capture the orientation of other road users. The capturing of the orientation of other road users must be highly accurate and fast. If not, the control systems of the motor vehicle would react with a delay or would react to a wrong input, which could result in an impact.

Various approaches existed to achieve the capturing of the orientation of other road users with various types of sensors, such as mono camera systems and LIDAR sensors. Algorithms for recognizing road users, such as other motor vehicles, based on machine learning offer only limited quality. On the other hand, image-processing algorithms, such as optical flow in combination with an iterative closest point (ICP) algorithm, are able to provide accurate results. However, these algorithms require considerable computational power and are generally used only for recognizing moving objects. Moreover, it is not possible to use them in autonomous vehicle hardware because the motor vehicle should not provide too much power for operating corresponding processors.

Such a method in which image data of a stereo camera system and LIDAR data of a LIDAR sensor are evaluated is known, for example, from U.S. Pat. No. 7,974,442 A1.

There is thus a need to specify ways in which the requirement of computational resources can be reduced.

SUMMARY

The present disclosure relates to a method for operating a motor vehicle having a stereo camera system and having a LIDAR sensor.

The method for operating a motor vehicle having a stereo camera system for capturing image data and having a LIDAR sensor for capturing LIDAR data, wherein an orientation of a road user is determined, includes:
receiving a request signal,
receiving and evaluating image data to determine an orientation of a road user when the request signal indicates the quality is below a predetermined quality for the determination of the orientation of the road user, and
receiving and evaluating LIDAR data and the image data to determine the orientation of the road user when the request signal indicates the quality is the predetermined quality for the determination of the orientation of the road user.

In other words, either only the image data of the stereo camera system or additionally also the LIDAR data of the system are evaluated based on a required, predetermined quality for the determination of the orientation of the road user. In this context, the predetermined quality is a measure of the data content. This can be a quantity of data, additional categories, such as depth information or speed values, a noise value or a confidence interval. In this way, there is a flexible response to the respective requests and a particularly computationally intensive evaluation of the LIDAR data is performed only if necessary. This reduces the requirement for of computer resources.

According to an embodiment, training data based on CAD (Computer-Assisted Design) data sets are used for evaluating the image data. In other words, the CAD data sets are based on models of other road users that have been used for the construction of the former. Consequently, particularly high-quality training data is available so that it is possible to keep a learning phase with the training data particularly short.

According to a further embodiment, an artificial neural network, e.g., a convolutional neural network or a deep neural network, or an AdaBoost algorithm is used to evaluate the image data. The artificial neural network with a plurality of artificial neurons can thus be configured as a convolutional neural network (CNN) having one or more convolutional layers, followed by a pooling layer. The artificial neural network can furthermore also be of multilayer configuration, i.e., the artificial neurons are arranged in multiple layers, e.g., intermediate layers. The AdaBoost algorithm is an algorithm for automatic classification, combining multiple weak classifiers to build one good classifier. It is possible in this way to attain a particularly accurate evaluation while keeping the requirement in terms of computer resources low.

According to a further embodiment, an iterative closest point (ICP) algorithm is used to evaluate the LIDAR data. The iterative closest point algorithm is an algorithm that allows data that is available as point clouds to be matched to one another. It is possible in this way to attain a particularly accurate adaptation while keeping the requirement for computer resources low.

According to a further embodiment, only a relevant portion of the LIDAR data is evaluated while evaluating the image data. In other words, the image data is additionally used to determine the relevant portion of the LIDAR data LD that relates to the image data. Only this relevant portion of the LIDAR data is thus evaluated to determine the second data set. In this way, the quantity of data that must be processed and thus the requirement for computer resources can be reduced.

According to a further embodiment, a data exchange with another road user is performed. In other words, C2C communication is used to receive and evaluate data that indicates an orientation. Consequently, further data is available for data reconciliation, and by comparing multiple orientations captured by a plurality of road users, a quality for the determination of the orientation can be improved further.

The disclosure furthermore relates to a computer program product and to a motor vehicle of this type.

SUMMARY OF THE DRAWINGS

The disclosure will now be explained with reference to a drawing. In the drawing.

Figure 1:
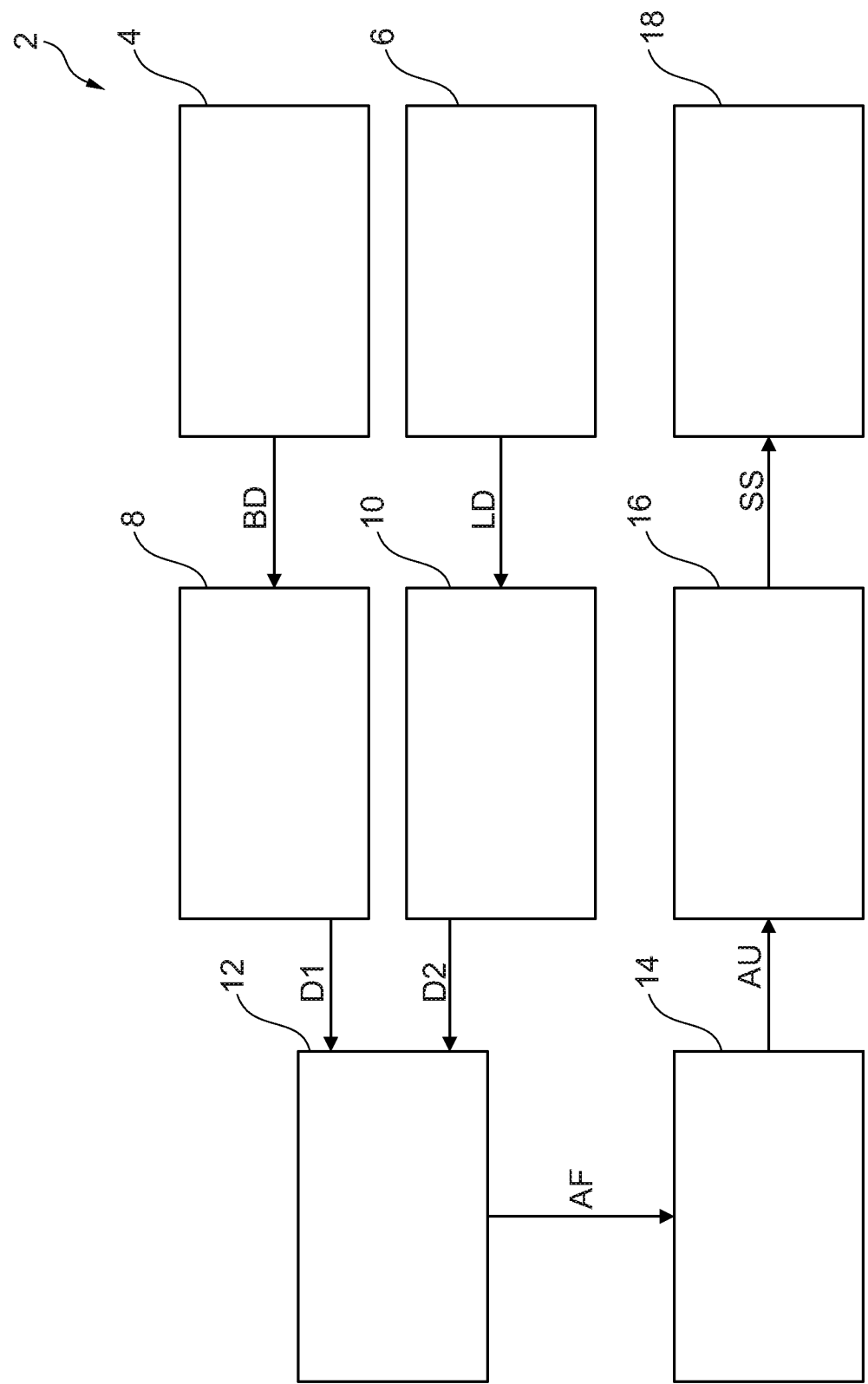
FIG. 1 shows a schematic illustration of a system overview.
Figure 2:
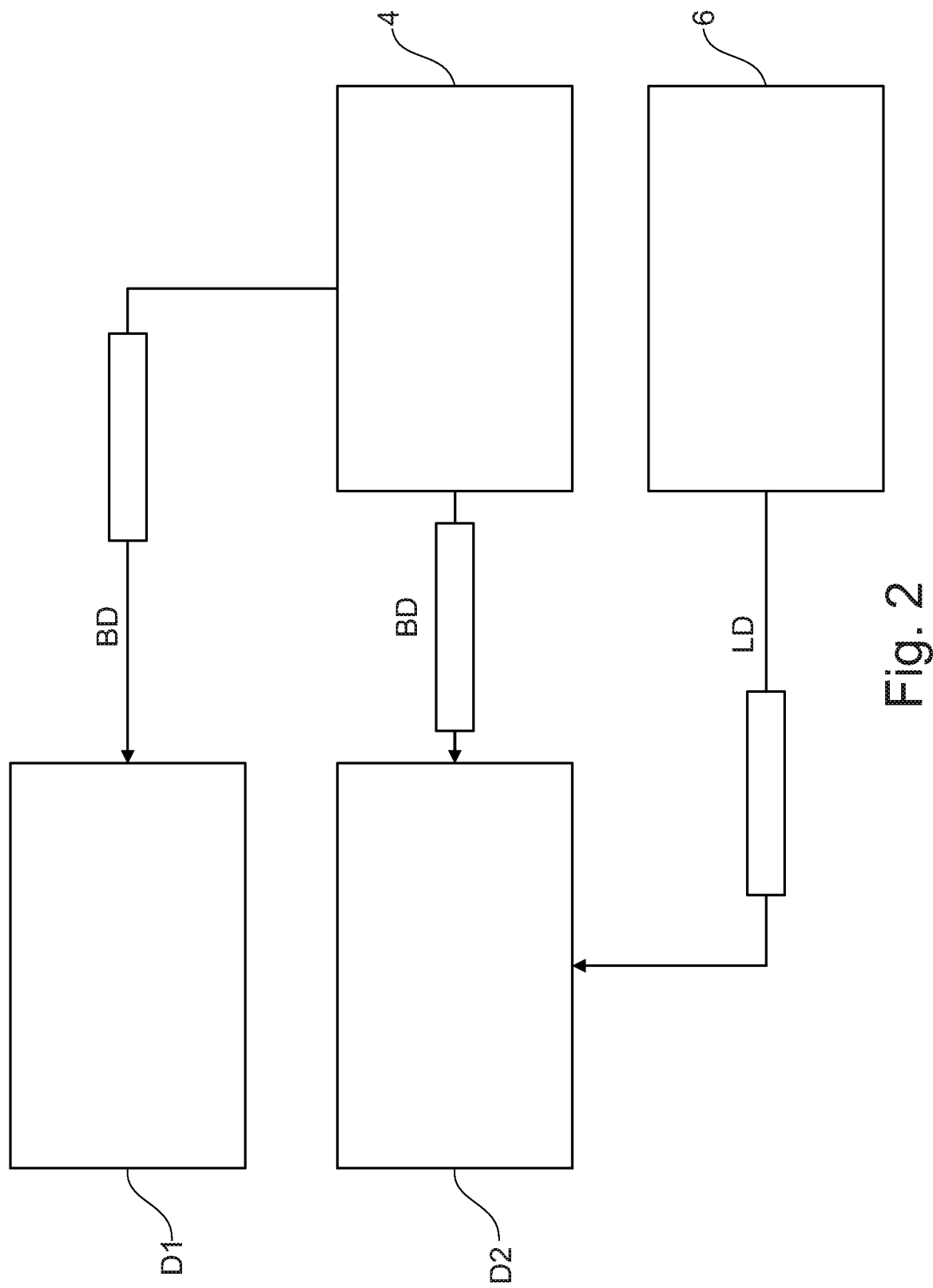
FIG. 2 shows a schematic illustration of details of the operation of the system shown in FIG. 1.

Reference will first be made to FIGS. 1 and 2.

A motor vehicle 2 and further components of the motor vehicle 2 are illustrated.

The components illustrated are a stereo camera system 4, a LIDAR sensor 6, an image data evaluation module 8, a LIDAR data evaluation module 10, a sensor data fusion module 12, an orientation determination module 14, a control device 16, and an actuator 18.

The motor vehicle 2 and the further components listed may each have hardware and/or software components for the tasks and/or functions described below.

In the present exemplary embodiment, the motor vehicle 2 is designed as a passenger car. The motor vehicle 2 in the present exemplary embodiment furthermore is embodied for autonomous driving, i.e. as a self-driving motor vehicle. In deviation from the present exemplary embodiment, the motor vehicle 2 can also be embodied in accordance with one of the SAE autonomy levels 1 to 5.

Autonomy level 0 here represents no automation, autonomy level 1 represents driver assistance, autonomy level 2 represents partial automation, autonomy level 3 represents conditional automation, autonomy level 4 represents high automation, and autonomy level 5 represents full automation.

The stereo camera system 4 is configured to provide image data BD representative of the surroundings of the motor vehicle 2, while the LIDAR sensor 6 is configured to provide LIDAR data LD representative of the surroundings of the motor vehicle 2.

The image data evaluation module 8 is provided here to evaluate the image data BD with spatial depth information to determine an orientation of a road user 2' (see FIG. 3), such as another motorized road user 2', such as a passenger car, truck or another utility vehicle.

The orientation of the road user 2' is here understood to mean a direction in which the road user 2' captured is driving or—if the other road user 2' is not moving—the direction in which a driving direction thereof points. For example, the orientation can indicate whether the other road user 2' is moving toward the motor vehicle 2 or is driving in front of it.

For this purpose, the image data evaluation module 8 is configured for machine learning. The image data evaluation module 8 thus learns from examples and can also generalize them after a learning phase has been completed. In other words, the examples are not just learned by heart, but patterns and rules in the training data are also detected. The image data evaluation module 8 can thus also assess unknown data.

Training data that is based on CAD data sets relating to models of other road users 2', such as various passenger cars, is used to train the image data evaluation module 8 during the learning phase.

In the present exemplary embodiment, the image data evaluation module 8 for evaluating the image data BD uses, for example, the AdaBoost algorithm, i.e., a meta algorithm based on machine learning. The AdaBoost algorithm is an algorithm for automatic classification, combining multiple weak classifiers to build one good classifier. In deviation from the present exemplary embodiment, other algorithms can also be used, such as random forest, DNN (deep neural network) and CNN (convolutional neural network).

The image data evaluation module 8 provides a first data set D1 that indicates an orientation of the road user 2' based only on an evaluation of the image data BD.

A LIDAR data evaluation module 10 is provided here for evaluating the LIDAR data LD to likewise determine an orientation of the other road user 2'.

For this purpose, the LIDAR data evaluation module 10 is likewise configured for machine learning. The LIDAR data evaluation module 10 can thus also assess unknown data.

In the present exemplary embodiment, the LIDAR data evaluation module 10 for evaluating the LIDAR data LD uses the iterative closest point algorithm. The iterative closest point algorithm is an algorithm that allows data that is available as point clouds to be matched to one another.

The LIDAR data evaluation module 10 provides a second data set D2 that indicates an orientation of the road user 2' based only on an evaluation of the LIDAR data LD.

The sensor data fusion module 12 is configured to determine whether a quality below the predetermined quality for the determination of the orientation of the road user 2' is sufficient, or whether the predetermined quality for the determination of the orientation of the road user 2' is required. For this purpose, the sensor data fusion module 12 evaluates a traffic scenario captured around the motor vehicle 2. If, for example, the motor vehicle 2 is following another road user 2' at a constant speed, only a quality below the predetermined quality is required, whereas the predetermined quality is required if, for example, an overtake maneuver is performed on a road that is only partial visible due to curves.

In the present exemplary embodiment, the sensor data fusion module 12 generates a request signal AF. The request signal AF is a logical variable that is assigned the value logic one if the predetermined quality is required. If not, the request signal AF is assigned the value logic zero.

The orientation determination module 14 is configured to evaluate only the first data set D1 if the request signal AF indicates a quality below the predetermined quality for the determination of the orientation of the road user 2'. In this case, an evaluation is thus performed only of the first data set D1 based on the image data BD.

The orientation determination module 14 is furthermore configured to also evaluate the LIDAR data LD in addition to the image data BD if the request signal AF indicates the predetermined quality for the determination of the orientation of the road user 2'. In this case, an evaluation is performed of the two data sets D1 and D2 based on the image data BD and the LIDAR data LD.

The orientation determination module 14 then provides an output data set AU representative of the orientation of the captured road user 2', which, in the first case, is based on only one data set D1 and therefore has a quality below the predetermined quality, whereas, in the second case, two data sets are combined as part of a sensor data fusion. The output data set AU therefore has the predetermined quality in the second case.

The control device 16 is configured to read and evaluate the output data set AU. The control device 16 can be configured, for example, as a collision protection system that can control actuators 18 using control signals SS to effect, for example, an intervention in components of a drivetrain and/or the steering of the motor vehicle 2.

With additional reference to FIG. 2, a motor vehicle 2 will now be explained that is configured for data exchange with another road user 2', in the present exemplary embodiment likewise a motor vehicle, such as a passenger car, truck or utility vehicle.

The motor vehicle 2 shown in FIG. 2 thus differs from the motor vehicle 2 shown in FIG. 1 by way of an additional transfer module 20, the tasks and functions of which, for which it likewise has hardware and/or software components, will be explained in detail below.

The road user 2' in the present exemplary embodiment has the same components as the motor vehicle 2 shown in FIG. 1, that is to say a stereo camera system 4', a LIDAR sensor 6', an image data evaluation module 8', a LIDAR data evaluation module 10', a sensor data fusion module 12', an orientation determination module 14', a control device 16', and an actuator 18' and also a transfer module 20.

The transfer module 20 is configured to receive and evaluate the output data set AU of the road user 2' via a wireless data transmission link to determine further data that indicates the orientation of the motor vehicle 2. In other words, the transfer module 20 transfers its own orientation, determined by the other road user 2', into its own coordination system. The transfer module 20' of the road user 2' operates analogously.

Consequently, further data is available for data reconciliation, and by comparing multiple orientations captured by a plurality of road users 2', the quality for the determination of the orientation can be improved further.

Figure 3:
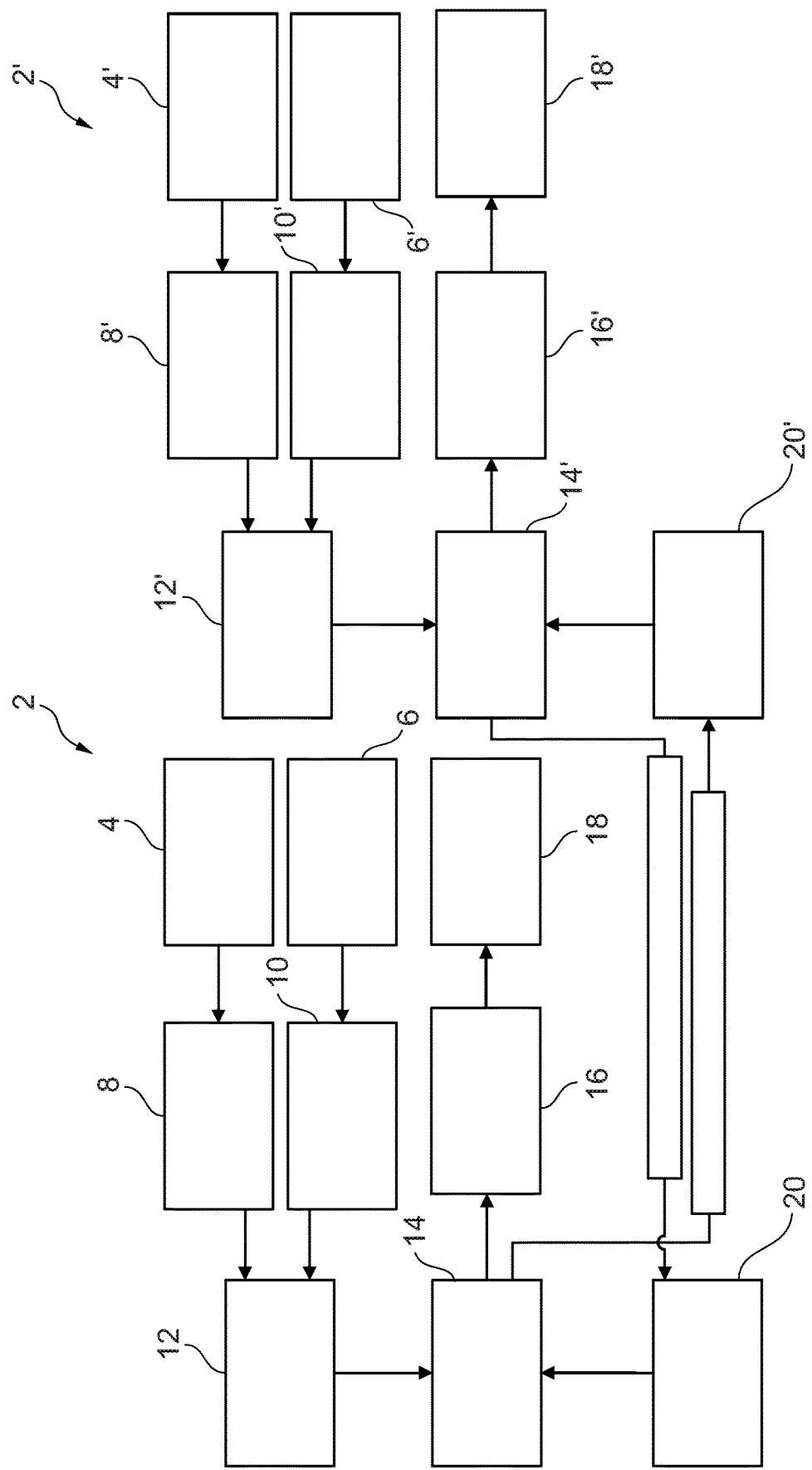
FIG. 3 shows a schematic illustration of a data exchange between a motor vehicle and another road user.
Figure 4:
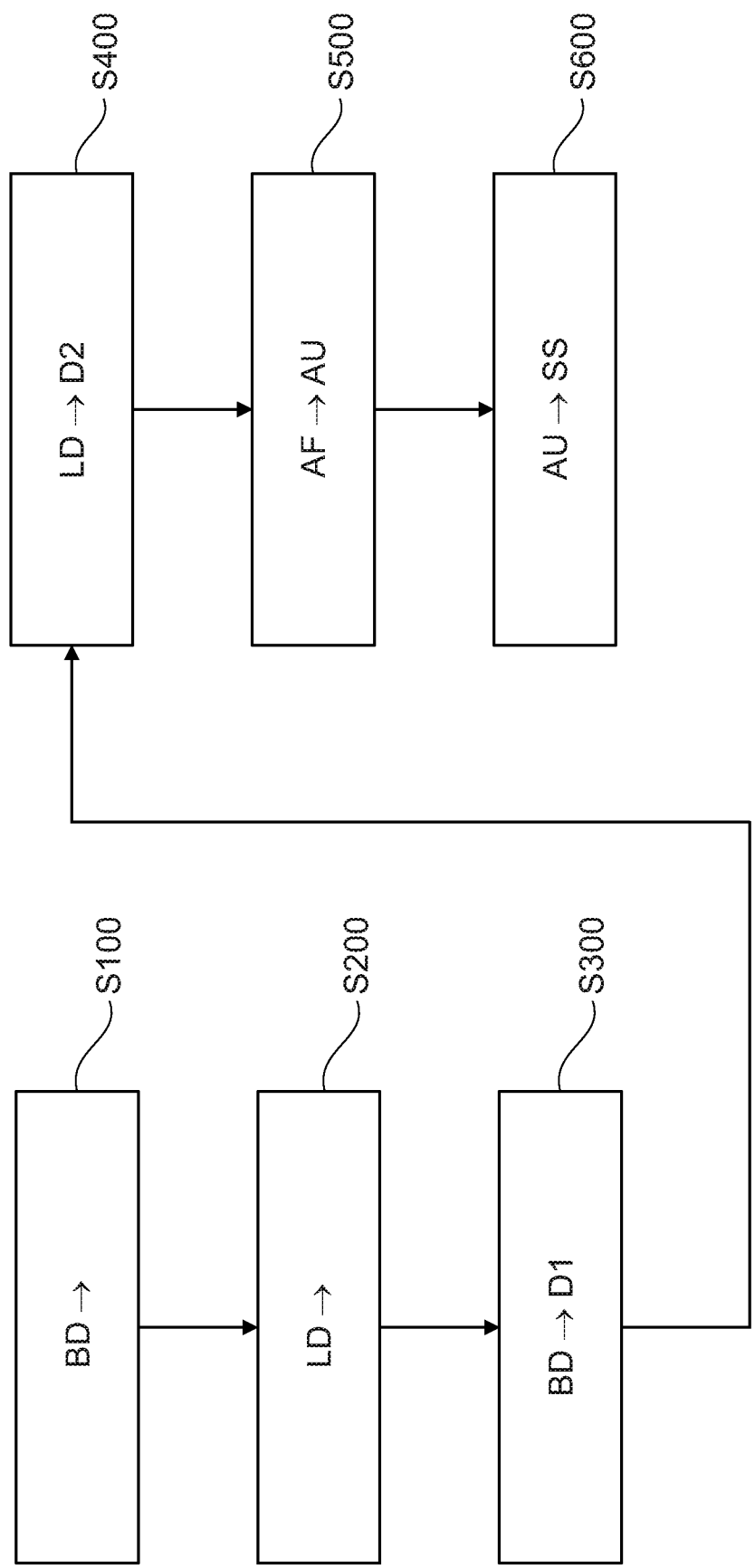
FIG. 4 shows a schematic illustration of a method sequence.

A method sequence will now be explained with additional reference to FIG. 3.

In a first step S100, the image data evaluation module 8 receives the image data BD captured using the stereo camera system 4.

In a further step S200, the LIDAR data evaluation module 10 receives the LIDAR data LD captured using the LIDAR sensor 6.

In a further step S300, the image data evaluation module 8 determines the first data set D1 that indicates an orientation of the road user 2' by evaluating the image data BD.

In this case, training data based on CAD data sets is used for evaluating the image data BD. Furthermore, an AdaBoost algorithm can be used for evaluating the image data BD.

In a further step S400, the LIDAR data evaluation module 10 determines the second data set D2 that indicates an orientation of the road user 2' by evaluating the LIDAR data LD.

It is possible to additionally use the image data BD to determine a relevant portion of the LIDAR data LD and then to evaluate only this relevant portion of the LIDAR data LD to determine the second data set D2.

Furthermore, an iterative closest point algorithm can be used for evaluating the LIDAR data LD.

In a further step S500, the request signal AF is determined and received by the orientation determination module 14.

If the request signal AF indicates a quality below the predetermined quality, the orientation determination module 14 evaluates the first data set D1 based on the image data BD. If, on the other hand, the request signal AF indicates the predetermined quality, the orientation determination module 14 evaluates not only the first data set D1 based on the image data BD, but also the second data set D2 based on the LIDAR data LD. The orientation determination module 14 then provides the output data set AU that is representative of the orientation of the captured road user 2'.

In a further step S600, the control device 16 reads the output data set AU and determines the control signals SS for controlling the actuators 18.

It is furthermore additionally possible—as already described—to perform a data exchange with other motor vehicles.

In deviation from the present exemplary embodiment, the order of the steps can also be different. Furthermore, a plurality of steps can also be carried out simultaneously. In deviation from the present exemplary embodiment, individual steps can furthermore also be skipped or omitted.

In this way, there is a flexible response to the respective requests, and a particularly computationally intensive evaluation of the LIDAR data LD is performed only if necessary. This reduces the requirement for computer resources.

LIST OF REFERENCE SIGNS

2 Motor vehicle
4 Stereo camera system
6 LIDAR sensor
8 Image data evaluation module
10 LIDAR data evaluation module
12 Sensor data fusion module
14 Orientation determination module
16 Control device
18 Actuator
20 Transfer module
2' Road user
4' Stereo camera system
6' LIDAR sensor
8' Image data evaluation module
10' LIDAR data evaluation module
12' Sensor data fusion module
14' Orientation determination module
16' Control device
18' Actuator
20' Transfer module
AF Request signal
AU Output data set
BD Image data D1 Data set
D2 Data set
LD LIDAR data
SS Control signal
S100 Step
S200 Step
S300 Step
S400 Step
S500 Step
S600 Step

The invention claimed is:

1. A method for operating a motor vehicle, comprising:
capturing sensor data that includes image data, via a stereo camera system, and light detection and ranging (LIDAR) data, via a LIDAR sensor;
receiving a request signal that indicates a quality of the sensor data for a determination of an orientation of a road user; and
determining the orientation of the road user based on a relevant portion of the LIDAR data and the image data when the request signal indicates the quality of the sensor data is at or above the predetermined quality; wherein the relevant portion of the LIDAR data is determined based on the image data.

2. The method according to claim 1, further comprising inputting the image data into a machine learning program that outputs the orientation of the road user.

3. The method according to claim 2, further comprising training the machine learning program with training data based on Computer-Assisted Design (CAD) data sets.

4. The method according to claim 1, further comprising;
inputting the LIDAR data to an iterative closest point algorithm that outputs an orientation of the road user based on LIDAR data;
inputting the image data into a machine learning program that outputs an orientation of the road user based on image data; and
combining the outputs of the iterative closest point algorithm and the machine learning program to determine the orientation of the road user.

5. The method according to claim 1, further comprising determining the orientation of the road user additionally based on receiving, from another road user, the orientation of the road user.

6. The method according to claim 1, further comprising actuating a vehicle actuator based on the orientation of the road user.

7. The method according to claim 1, further comprising determining the quality based on an operation of a motor vehicle.

8. The method according to claim 1, wherein the quality is a measure of a quantity of data.

9. The method according to claim 1, wherein the road user is a motor vehicle.

10. A system for a motor vehicle, comprising:
a stereo camera system configured to capture image data;
a light detection and ranging (LIDAR) sensor configured to capture LIDAR data; and
a control device configured to:
receive a request signal that indicates a quality of the sensor data for a determination of an orientation of a road user; and
determine the orientation of the road user based on a relevant portion of the LIDAR data and the image data when the request signal indicates the quality of the sensor data is at or above the predetermined quality; wherein the relevant portion of the LIDAR data is determined based on the image data.

11. The system according to claim 10, wherein the control device is further configured to input the image data into a machine learning program that outputs the orientation of the road user.

12. The system according to claim 11, wherein the control device is further configured to train the machine learning program with training data based on Computer-Assisted Design (CAD) data.

13. The system according to claim 10, wherein the control device is further configured to:
input the LIDAR data to an iterative closest point algorithm that outputs an orientation of the road user based on LIDAR data;
input the image data into a machine learning program that outputs an orientation of the road user based on image data; and
combine the outputs of the iterative closest point algorithm and the machine learning program to determine the orientation of the road user.

14. The system according to claim 10, wherein the control device is further configured to determine the orientation of the road user additionally based on receiving, from another road user, the orientation of the road user.

15. The system according to claim 10, wherein the control device is further configured to actuate a vehicle actuator based on the orientation of the road user.

16. The system according to claim 10, wherein the control device is further configured to determine the quality based on an operation of the system.

17. The system according to claim 10, wherein the quality is a measure of a quantity of data.

18. The system according to claim 10, wherein the road user is a second motor vehicle.

19. A method for operating a motor vehicle, comprising:
capturing sensor data that includes image data, via a stereo camera system, and light detection and ranging (LIDAR) data, via a LIDAR sensor;
receiving a request signal that indicates a quality of the sensor data for a determination of an orientation of a road user; and
determining the orientation of the road user based on the LIDAR data and the image data when the request signal indicates the quality of the sensor data is at or above the predetermined quality by
inputting the LIDAR data to an iterative closest point algorithm that outputs an orientation of the road user based on LIDAR data;
inputting the image data into a machine learning program that outputs an orientation of the road user based on image data; and
combining the outputs of the iterative closest point algorithm and the machine learning program to determine the orientation of the road user.

20. The method according to claim 19, further comprising actuating a vehicle actuator based on the orientation of the road user.

* * * * *